(12) United States Patent
Tang et al.

(10) Patent No.: US 11,773,467 B2
(45) Date of Patent: Oct. 3, 2023

(54) METHOD AND SYSTEM FOR PROCESSING RARE EARTH CONCENTRATE ORE

(71) Applicant: CHINA ENFI ENGINEERING CORPORATION, Beijing (CN)

(72) Inventors: Jianwen Tang, Beijing (CN); Guoshan Du, Beijing (CN); Pengfei Xian, Beijing (CN); Shuang Qiu, Beijing (CN); Wenlong Zhou, Beijing (CN); Bo Qin, Beijing (CN)

(73) Assignee: CHINA ENFI ENGINEERING CORPORATION, Beijing (CN)

( * ) Notice: Subject to any disclaimer, the term of this patent is extended or adjusted under 35 U.S.C. 154(b) by 965 days.

(21) Appl. No.: 16/663,964

(22) Filed: Oct. 25, 2019

(65) Prior Publication Data
US 2020/0056265 A1    Feb. 20, 2020

Related U.S. Application Data

(63) Continuation of application No. PCT/CN2018/095309, filed on Jul. 11, 2018.

(30) Foreign Application Priority Data

Jul. 17, 2017 (CN) .......................... 201710582942.9

(51) Int. Cl.
*C22B 59/00* (2006.01)
*C22B 1/06* (2006.01)
(Continued)

(52) U.S. Cl.
CPC ................ *C22B 59/00* (2013.01); *C22B 1/06* (2013.01); *C22B 3/08* (2013.01); *C22B 3/22* (2013.01); *C22B 60/0291* (2013.01)

(58) Field of Classification Search
CPC .. C22B 59/00; C22B 3/08; C22B 3/22; C22B 1/06; C22B 60/0291; C22B 3/04; Y02P 10/20
(Continued)

(56) References Cited

U.S. PATENT DOCUMENTS

| 7,282,187 B1 * | 10/2007 | Brown | .................. C22B 60/026 423/63 |
| 2013/0336856 A1 * | 12/2013 | Berni | ...................... C22B 59/00 423/21.1 |
| 2015/0307958 A1 * | 10/2015 | Wang | ...................... C22B 60/02 75/394 |

FOREIGN PATENT DOCUMENTS

CN    103074504 A  *  5/2013

OTHER PUBLICATIONS

CN-103074504-A Translation (Year: 2013).*
WIPO, ISR for PCT/CN2018/095309, dated Sep. 27, 2018.

* cited by examiner

*Primary Examiner* — Brian D Walck
*Assistant Examiner* — Danielle M. Carda
(74) *Attorney, Agent, or Firm* — Hodgson Russ LLP

(57) ABSTRACT

Provided are a method and a system for processing a rare earth concentrate ore. The method comprises (1) mixing the rare earth concentrate ore and concentrated sulfuric acid, thereby obtaining a mixed slurry and a first fluorine-containing gas; (2) mixing the mixed slurry and an initiator liquid for acidolysis, thereby obtaining a clinker and a second fluorine-containing gas; (3) subjecting the clinker to leaching with water, thereby obtaining a leached slurry; (4) subjecting the leached slurry to a solid-liquid separation, thereby obtaining a filtrate and a leached slag, and recycling the leached slag to step (2) for acidolysis again.

11 Claims, 3 Drawing Sheets

(51) Int. Cl.
  *C22B 3/22* (2006.01)
  *C22B 3/08* (2006.01)
  *C22B 60/02* (2006.01)
(58) Field of Classification Search
  USPC .......................................................... 75/394
  See application file for complete search history.

US 11,773,467 B2

METHOD AND SYSTEM FOR PROCESSING RARE EARTH CONCENTRATE ORE

CROSS-REFERENCE TO RELATED APPLICATION

This application is a continuation of International Application PCT/CN2018/095309, filed Jul. 11, 2018, which claims priority to Chinese Patent Application No. 201710582942.9, filed Jul. 17, 2017. The entire disclosures of which are incorporated herein by reference.

FIELD

The present disclosure relates to the field of rare earth production, in particular to a method and a system for processing a rare earth concentrate ore.

BACKGROUND

Baotou mixed ore, i.e., a mixed ore of bastnaesite and monazite (phosphorus cerium lanthanum ore/phosphorus lanthanum cerium stone), and bastnasite ore are important resources of rare earth ores in China. In view of the characteristics of Baotou mixed ore, an existing industrial method for processing such an ore is a process of calcination with concentrated sulfuric acid. The process is continuous and controllable, which can be applied in large scale production. However, during the process, the mixed ore is decomposed at a high temperature, and thorium in the ore is converted into thorium pyrophosphate in the slag, resulting in radioactive pollution and waste of thorium. Moreover, it is difficult to recycle exhaust gas containing fluorine and sulfur of this process. In view of characteristics of the bastnasite ore, an existing industrial method is an acidolysis process such as an oxidation calcining-hydrochloric acid dissolving process. Such a process is less expensive but cannot be performed in a continuous manner. Further, thorium and fluorine in slag and wastewater, respectively, are difficult to be recycled, resulting in pollution to the environment. It can be seen that the treatment of the mixed ore or the bastnasite ore at the high temperature is likely to cause the waste of thorium resources and environmental pollution due to the exhaust gas.

Therefore, the existing technology for processing a rare earth concentrate ore needs to be further improved.

SUMMARY

The present disclosure aims to solve at least one of the above technical problems to some extent. Accordingly, an object of the present disclosure is to provide a method and a system for processing a rare earth concentrate ore.

In an aspect, the present disclosure provides in embodiments a method for processing a rare earth concentrate ore, including:

(1) mixing the rare earth concentrate ore and concentrated sulfuric acid, thereby obtaining a mixed slurry and a first fluorine-containing gas;

(2) mixing the mixed slurry and an initiator liquid for acidolysis, thereby obtaining a clinker and a second fluorine-containing gas;

(3) subjecting the clinker to leaching with water, thereby obtaining a leached slurry;

(4) subjecting the leached slurry to a solid-liquid separation, thereby obtaining a filtrate and a leached slag, and recycling the leached slag to step (2) for acidolysis again.

In some embodiments of the present disclosure, before mixing the rare earth concentrate ore and concentrated sulfuric acid, the method further includes: (5) subjecting the rare earth concentrate ore to ball-milling, thereby obtaining rare earth concentrate ore particles; (6) sieving the rare earth concentrate ore particles, thereby obtaining an oversize material and an undersize material, and recycling the oversize material to ball-milling and mixing the undersize material and concentrated sulfuric acid.

In some embodiments of the present disclosure, the method and the system for processing a rare earth concentrate ore further includes: (7) subjecting the first fluorine-containing gas and the second fluorine-containing gas to spraying with a spray liquid, thereby obtaining a fluorine-containing slurry.

In some embodiments of the present disclosure, in step (1), the rare earth concentrate ore has a particle diameter ranging from 80 to 320 meshes.

In some embodiments of the present disclosure, in step (1), a mass ratio of the rare earth concentrate ore to the concentrated sulfuric acid is in a range of 1:(1.2 to 1.5).

In some embodiments of the present disclosure, in step (1), the mixing is performed at a temperature of not higher than 30° C. for a time period in a range of 5 to 15 minutes.

In some embodiments of the present disclosure, in step (1), the concentrated sulfuric acid has a mass concentration of not less than 93 wt %.

In some embodiments of the present disclosure, in step (2), the acidolysis is performed at a temperature ranging from 150 to 300° C. for a time period in a range of 1 to 4 hours.

In some embodiments of the present disclosure, in step (2), the initiator liquid is at least one selected from industrial water and a filtrate from a subsequent process.

In some embodiments of the present disclosure, in step (3), a time period of leaching is in a range of 0.5 to 1 h.

In some embodiments of the present disclosure, in step (3), a mass ratio of water to the clinker is in a range of (8 to 12):1.

In some embodiments of the present disclosure, in step (7), the spray liquid is at least one selected from water and an alkaline liquid.

In another aspect, the present disclosure provides in embodiments a system for processing a rare earth concentrate ore as described above, including:

a mixing device having a rare earth concentrate ore inlet, a concentrated sulfuric acid inlet, a mixed slurry outlet and a first fluorine-containing gas outlet, in which an agitator is arranged in the mixing device and a water-cooled jacket is disposed on an outer wall of the mixing device;

an acidolysis device having a mixed slurry inlet, an initiator liquid inlet, a clinker outlet and a second fluorine-containing gas outlet, in which the mixed slurry inlet is connected to the mixed slurry outlet, a stirring propeller is arranged in the acidolysis device, and a heating device is disposed on an outer wall of the acidolysis device;

a leaching device having a clinker inlet, a water inlet, and a leached slurry outlet, in which the clinker inlet is connected to the clinker outlet; and a solid-liquid separator having a leached slurry inlet, a filtrate outlet and a leached slag outlet, in which the leached slurry inlet is connected to the leached slurry outlet, and the leached slag outlet is connected to the acidolysis device.

In some embodiments of the present disclosure, the system further includes: a ball-milling device having a rare earth concentrate ore inlet and a rare earth concentrate ore particle outlet; a sieving device having a rare earth concentrate ore particle inlet, an oversize material outlet and a undersize material outlet, in which the rare earth concentrate ore particle inlet is connected to the rare earth concentrate ore particle outlet, the oversize material outlet is connected to the ball-milling device, and the undersize material outlet is connected to the rare earth concentrate ore inlet.

In some embodiments of the present disclosure, the system further includes: a gas processing device having a fluorine-containing gas inlet, a spray liquid inlet and a fluorine-containing slurry outlet, in which the fluorine-containing gas inlet is connected to both the first fluorine-containing gas outlet and the second fluorine-containing gas outlet.

In some embodiments of the present disclosure, in the mixing device, the rare earth concentrate ore inlet, the concentrated sulfuric acid inlet and the first fluorine-containing gas outlet are independently located above the agitator, and the mixed slurry outlet is located below the agitator.

In some embodiments of the present disclosure, in the acidolysis device, the mixed slurry inlet and the second fluorine-containing gas outlet are independently located at an upper portion of the acidolysis device, and the clinker outlet is located at a lower portion of the acidolysis device.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
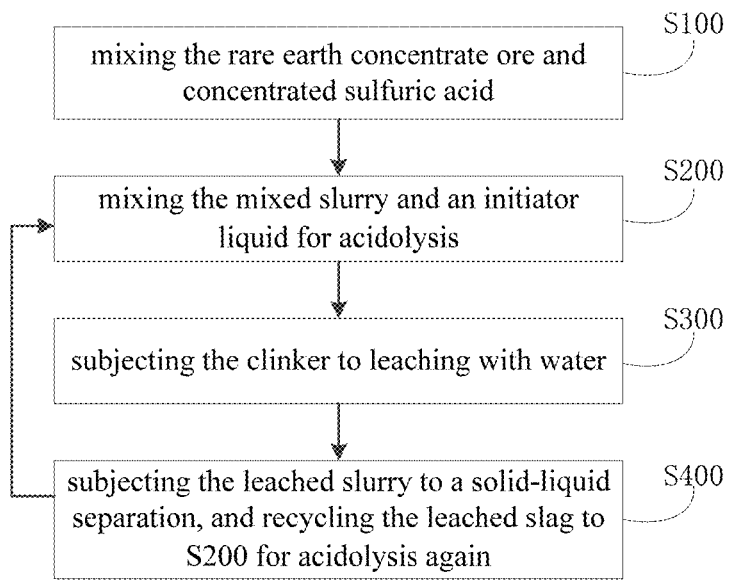
FIG. 1 is a flow chart showing a method for processing a rare earth concentrate ore according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial direction", "radial direction" and "circumferential direction" should be construed to refer to the orientation as then described or as shown in the drawings under discussion. These relative terms are for convenience of description and do not require that the present invention be constructed or operated in a particular orientation, and thus shall not be construed to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may include one or more this feature. In the description of the present disclosure, "a plurality of" means two or more than two this features, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

In an aspect, the present disclosure provides in embodiments a method for processing a rare earth concentrate ore. With reference to FIG. 1, such a method includes following steps.

In S100, the rare earth concentrate ore and concentrated sulfuric acid are mixed.

In this step, the rare earth concentrate ore is mixed with the concentrated sulfuric acid to obtain a mixed slurry and a first fluorine-containing gas. Specifically, the rare earth concentrate ore and the concentrated sulfuric acid are mixed in the mixing device, a small amount of gas containing $CO_2$, HF and $SiF_4$ will be generated during mixing and stirring the concentrated sulfuric acid. $CO_2$ and HF are from the reactions between carbonates in the rare earth concentrate ore and the concentrated sulfuric acid. Moreover, some solid dust will be accompanied in the first fluorine-containing gas. Specifically, the rare earth concentrate ore having a suitable particle diameter is added to the mixing device through a quantitative feeder and mixed with the metered concentrated sulfuric acid in a certain ratio. After stirring for a certain period, the mixed slurry is formed, during which circulating water is used for cooling, so as to control the temperature inside the mixing device within a suitable range. It is found that, by arranging an agitator in the mixing device, the rare earth concentrate ore and concentrated sulfuric acid can be mixed rapidly and forcibly, such that the rare earth concentrates are sufficiently infiltrated by the concentrated sulfuric acid, thus preventing agglomeration from occurring in the subsequent acidolysis process and providing favorable conditions for mass transfer of the acidolysis process. Moreover, a water-cooled jacket is disposed on the mixing device to cool the mixing device with the circulating water, such that the temperature inside the mixing device is kept in a constant range. It should be noted that the above rare earth concentrate ore may be an bastnaesite ore (a fluorocarbon cerium rare earth ore) or a Baotou mixed ore (bastnaesite and monazite).

In an embodiment of the present disclosure, the particle diameter of the rare earth concentrate ore is not particularly limited, and may be selected by those skilled in the art according to actual needs. In a specific embodiment of the present disclosure, the rare earth concentrate ore may have a particle diameter ranging from 80 to 320 meshes. It is found that if the particle diameter of the rare earth concentrate ore is too large, it is not conducive to the reaction between the rare earth concentrate ore and the concentrated sulfuric acid. While a small particle diameter can increase the contact area between the rare earth concentrate ore and the concentrated sulfuric acid, but if the particle diameter is too small, the reaction will be too intense, making it impossible to be controlled, thereby consuming excessive energy for milling and reducing the decomposition rate of rare earth concentrate ore as well. Therefore, the particle diameter of the rare earth concentrate ore according to the embodiment of the present disclosure can significantly increase the decomposition rate of the rare earth concentrate ore and save energy at the same time.

In another embodiment of the present disclosure, a mass ratio of the rare earth concentrate ore to the concentrated sulfuric acid is not particularly limited, and may be selected by those skilled in the art according to actual needs. In a specific embodiment of the present disclosure, the mass ratio of the rare earth concentrate ore to the concentrated sulfuric acid is in a range of 1:(1.2 to 1.5). It is found that if the mass ratio of the rare earth concentrate ore to the concentrated sulfuric acid is too large, the reaction between the rare earth concentrate ore and the concentrated sulfuric acid is insufficient, resulting in low decomposition rate of the rare earth concentrate ore and difficulty in separating thorium from the rare earth concentrate ore, in this case thorium is enriched in the leached slag to form a radioactive slag. If the mass ratio of the rare earth concentrate ore to the concentrated sulphuric acid is too small, the concentrated sulfuric acid is excessively consumed, the mixing time is prolonged, and the residual acid in the subsequent processes is high.

Therefore, the mass ratio of the rare earth concentrate ore and the concentrated sulfuric acid provided by the present disclosure can further increase the decomposition rate of the rare earth concentrate ore, and at the same time increase a mixing rate and save energy.

In still another embodiment of the present disclosure, mixing conditions are not particularly limited, and may be selected by those skilled in the art according to actual needs. In a specific embodiment of the present disclosure, the mixing is performed at a temperature of not higher than 30° C. for a time period in a range of 5 to 15 minutes. It is found that if the mixing temperature is too high, the rare earth concentrate ore will be reacted with the concentrated sulfuric acid locally in advance, resulting in a poor mixing effect. If the mixing time period is too short to reach the condition that the rare earth concentrate ore is in full contact with the concentrated sulfuric acid, mass transfer will be negatively affected. Therefore, if the mixing temperature is too high and the mixing time is too long or too short, the decomposition rate of oxides of the rare earth elements is decreased.

In a further embodiment of the present disclosure, a mass concentration of the concentrated sulfuric acid is not particularly limited, and may be selected by those skilled in the art according to actual needs. In a specific embodiment of the present disclosure, the concentrated sulfuric acid has a mass concentration of not less than 93 wt %. It is found that the mass concentration of the concentrated sulfuric acid can significantly improve the efficiency of infiltrating the rare earth concentrate ore, and at the same time improve the quality of the mixed slurry, thus increasing the decomposition rate of the oxides of the rare earth elements.

In S200, the mixed slurry and an initiator liquid are mixed for acidolysis.

In this step, the mixed slurry and an initiator liquid are mixed for decomposition with acid to obtain a clinker and a second fluorine-containing gas. Specifically, the mixed slurry is added to an acidolysis device through a mixed slurry outlet of the mixing device, and a valve of an initiator liquid inlet is opened. The concentrated sulfuric acid in the mixed slurry is diluted to release heat, and a temperature inside the acidolysis device is adjusted by an auxiliary heating device, so as to perform the acidolysis reaction completely in the acidolysis device to form a bulk clinker. It is found that two processes of aging and calcining can be realized in an acidolysis device at the same time, thus significantly shortening the time period of acidolysis reaction of the rare earth concentrate ore. Moreover, in the acidolysis process, viscosity of the internal materials changes greatly, that is, the internal materials are changed gradually from a fluid state to a semi-dry state, and finally become dry, thereby obtaining the clinker. The acidolysis device can effectively cope with the changes in the characteristics of the above materials. Further, a stirring propeller is arranged in the acidolysis device to accelerate the progress of the acidolysis reaction, and a heating device is disposed on an outer wall of the acidolysis device to provide a suitable temperature for the acidolysis reaction. Since the temperature of the entire acidolysis process is kept low, sulfur-containing gas is prevented from being generated due to the decomposition of the concentrated sulfuric acid, and thus it is possible to recycle the second fluorine-containing gas. At the same time, thorium is prevented from being in the slag which may cause the radioactive pollution and the waste of thorium.

In an embodiment of the present disclosure, acidolysis conditions are not particularly limited, and may be selected by those skilled in the art according to actual needs. In a specific embodiment of the present disclosure, the acidolysis is performed at a temperature ranging from 150 to 300° C. for a time period in a range of 1 to 4 hours. It is found that if the acidolysis temperature is too high, the concentrated sulfuric acid will be decomposed to generate sulfur-containing gas, and at the same time, it may be difficult to leach thorium from the clinker into the solution, and thorium may remain in the leached slag to form the radioactive solid waste. If the acidolysis temperature is too low or the acidolysis time period is too short, the decomposition rate of the oxides of the rare earth elements is low. If the acidolysis time period is too long, the decomposition rate of the rare earth concentrate ore is not further increased after it reaches a certain degree, but the energy consumption is increased and a time period of the whole process is prolonged. Therefore, the temperature and time period of the acidolysis provided by the present disclosure can significantly increase the decomposition rate of the rare earth concentrate ore, increase the leaching rate of the thorium and save energy at the same time.

In another embodiment of the present disclosure, the type of the initiator liquid is not particularly limited, and may be selected by those skilled in the art according to actual needs. In a specific embodiment of the present disclosure, the initiator liquid is at least one selected from industrial water and a filtrate from a subsequent process. It is found that a certain temperature should be reached to perform the acidolysis reaction. The initiator liquid is used for diluting the concentrated sulfuric acid to release heat to increase the temperature of the mixed slurry and activate the acidolysis reaction, such that the dilution heat can be utilized to reduce supply of an external heat source.

In the process, the rare earth concentrate ore and the concentrated sulfuric acid are mixed and heated to a certain temperature, components REO, $ThO_2$ and the like contained in the concentrate ore are reacted with sulfuric acid to form soluble sulfates. $CaF_2$, $Fe_2O_3$ and the like are also reacted to different degrees into sulfates. Rare earth sulfates, thorium sulfate, iron sulfate or the like can be dissolved in an aqueous solution. Fluorine exists in a form of HF or $SiF_4$ in calcined exhaust gas and can be reacted with ammonia in the presence of vapour to form solid ammonium bifluoride ($NH_4HF_2$), which is sold as a product. During such a process (at 150 to 300° C.), sulfuric acid does not decompose and only a small amount of sulfuric acid is evaporated. There are only HF, $SiF_4$ and a small amount of sulfuric acid mist in flue gas, thus improving conditions for recycling fluorine as a by-product from the flue gas. Specifically, for example, the rare earth concentrate ore is a mixed ore of bastnaesite and monazite, chemical reactions of the process are as follows.

(1) main reactions of the acidolysis of bastnaesite concentrate ore are as follows.

$$2REFCO_3 + 3H_2SO_4 = RE_2(SO_4)_3 + 2HF\uparrow + 2CO_2\uparrow + 2H_2O$$

$$ThO_2 + 2H_2SO_4 = Th(SO_4)_2 + 2H_2O$$

(2) monazite is decomposed as follows.

$$2REPO_4 + 3H_2SO_4 = RE_2(SO_4)_3 + 2H_3PO_4$$

$$Th_3(PO_4)_4 + 6H_2SO_4 = 3Th(SO_4)_2 + H_3PO_4$$

Side reactions are as follows.

$$CaF_2 + H_2SO_4 = CaSO_4 + 2HF\uparrow$$

$$Fe_2O_3 + 3H_2SO_4 = Fe_2(SO_4)_3 + 3H_2O$$

$$SiO_2 + 4HF = SiF_4\uparrow + 2H_2O$$

In S300, the clinker is subjected to leaching with water.

In this step, the clinker is mixed with water for leaching, thereby obtaining a leached slurry. Specifically, the bulk clinker in the acidolysis device is sent, through a clinker outlet, to the leaching device via a quantitative screw conveyor, and then a certain proportion of water is added to perform the leaching. After a period of time, the leached slurry is formed. It is found that after thorium is converted into thorium acid slat in the acidolysis process, the thorium acid slat is leached into the leached slurry. On this basis, thorium can be recycled to avoid the radioactive hazard to the environment.

In an embodiment of the present disclosure, leaching conditions are not particularly limited, and may be selected by those skilled in the art according to actual needs. In a specific embodiment of the present disclosure, a leaching temperature is an environment temperature and a time period of leaching is in a range of 0.5 to 1 h. It is found that the leaching temperature is the environment temperature, and sulfates in the clinker can be dissolved in water without heating, thus avoiding an external heat source. At the same time, an appropriate leaching period can ensure complete dissolution of the sulfates.

In another embodiment of the present disclosure, a mass ratio of water to the clinker is not particularly limited, and may be selected by those skilled in the art according to actual needs. In a specific embodiment of the present disclosure, the mass ratio of water to the clinker is in a range of (8 to 12):1. It is found that if the mass ratio of water to clinker is too small, sulfates may be supersaturated and thus crystallized, and the mass ratio of water to clinker should not be too large, otherwise, a material flow amount of the system may be too large, resulting in difficulties in processing subsequent waste liquid.

In S400, the leached slurry is subjected to a solid-liquid separation, and a leached slag is recycled to step (2) for acidolysis again.

In this step, the leached slurry is subjected to the solid-liquid separation, thereby obtaining a filtrate and a leached slag, and the leached slag is recycled to step (2) for acidolysis. Specifically, the leached slurry obtained from the leaching device is transferred to the solid-liquid separator by a pump for solid-liquid separation, thereby obtaining the filtrate and the leached slag. The leached slag is quantitatively returned to the acidolysis device in batches, and the filtrate is transferred to a next extraction process. Therefore, the decomposition rate of the oxides of the rare earth elements can be remarkably improved, and the thorium recovery rate can be improved at the same time.

With the method and the system for processing the rare earth concentrate ore according to embodiments of the present disclosure, by arranging the agitator in the mixing device, the rare earth concentrate ore and the concentrated sulfuric acid can be mixed rapidly and forcibly, such that the rare earth concentrates are sufficiently infiltrated by the concentrated sulfuric acid, thus preventing agglomeration from occurring in the subsequent acidolysis process and providing favorable conditions for mass transfer of the acidolysis process. Moreover, the water-cooled jacket is surrounding an outer wall of the mixing device to cool the mixing device with circulating water, such that the temperature inside the mixing device is kept in a constant range, in this case, it is possible to avoid the decomposition of rare earth ore at high temperatures, thereby realizing the recovery of thorium. In the present disclosure, two processes of aging and calcining can be realized in an acidolysis device at the same time, thus significantly shortening the time period of acidolysis reaction of the rare earth concentrate ore. Further, in the acidolysis process, viscosity of the internal materials changes greatly, that is, the internal materials are changed gradually from a fluid state to a semi-dry state, and finally become dry, thereby obtaining the clinker. The acidolysis device can effectively cope with the changes in the characteristics of the above materials. Further, a stirring propeller is arranged in the acidolysis device to accelerate the progress of the acidolysis reaction, and a heating device is disposed on an outer wall of the acidolysis device to provide a suitable temperature for the acidolysis reaction. Since the temperature of the entire acidolysis process is kept low, thorium is prevented from being in the slag which may cause the radioactive pollution and the waste of thorium, moreover, sulfur-containing gas is prevented from being generated in the decomposition of concentrated sulfuric acid, and thus it is possible to recycle the second fluorine-containing gas. In the acidolysis process, the thorium in the rare earth concentrate becomes thorium acid salt which enters into the leached slurry during leaching. Therefore, thorium can be recycled to avoid the radioactive hazard to the environment. The solid-liquid separation is further performed on the leached slurry, and the obtained leached slag can be recycled to the acidolysis process again, thus further improving a thorium recovery rate and the REO decomposition rate. Therefore, the present method has advantages of wide adaptability of raw materials, low energy consumption and continuous production. At the same time, thorium can be effectively recovered, and the decomposition rate of the rare earth concentrate ore can be significantly improved, for example, the REO decomposition rate can reach 96%.

Figure 2:
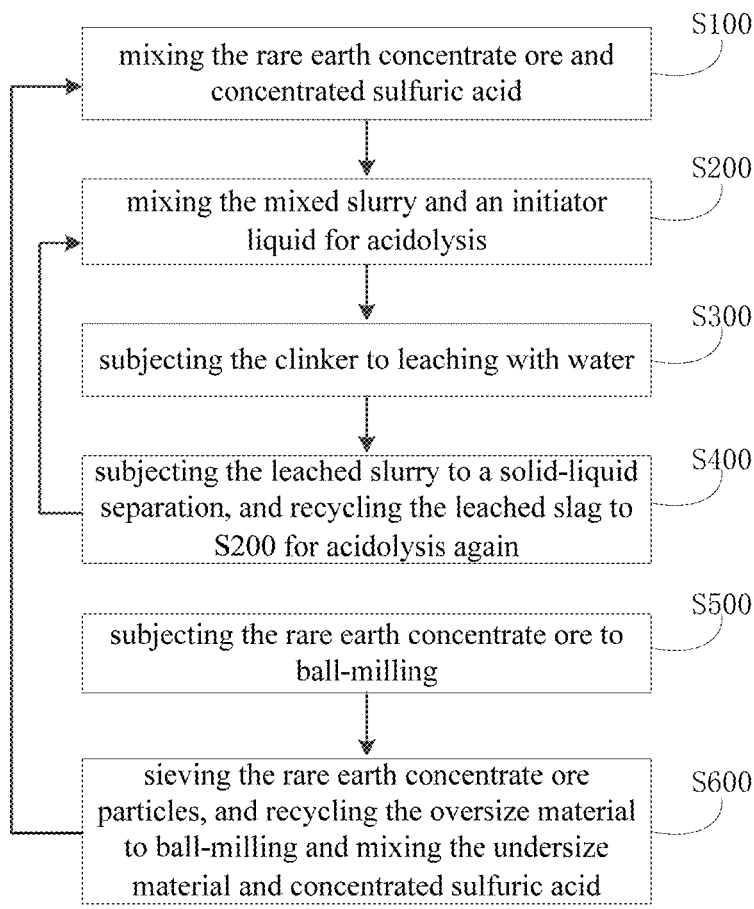
FIG. 2 is a flow chart showing a method for processing a rare earth concentrate ore according to another embodiment of the present disclosure.

In addition, in an embodiment of the present disclosure, as shown in FIG. 2, before mixing the rare earth concentrate ore and concentrated sulfuric acid, the method further includes following steps.

In S500, the rare earth concentrate ore is subjected to ball-milling.

In this step, the rare earth concentrate ore is subjected to ball-milling, thereby obtaining rare earth concentrate ore particles. Therefore, it is advantageous to increase the decomposition rate of the oxides of the rare earth elements.

In S600, the rare earth concentrate ore particles are sieved, and an oversize material is subjected to ball-milling and an undersize material is mixed with the concentrated sulfuric acid.

In this step, the rare earth concentrate ore particles obtained as described above are sieved, thereby obtaining an oversize material and an undersize material. The oversize material is recycled to ball-milling and the undersize material is mixed with the concentrated sulfuric acid. Therefore, the decomposition rate of the oxides of the rare earth elements may be further increased. It is found that sieved oversize material having an unqualified particle size is returned to a ball-milling device for ball-milling, raw material cost and time cost of this process can be significantly reduced, and sieved undersize material is transferred into the mixing device and mixed with the concentrated sulfuric acid, so as to further increase the decomposition rate of the oxides of the rare earth elements. Specifically, the undersize material has a particle diameter ranging from 80 to 320 meshes.

Figure 3:
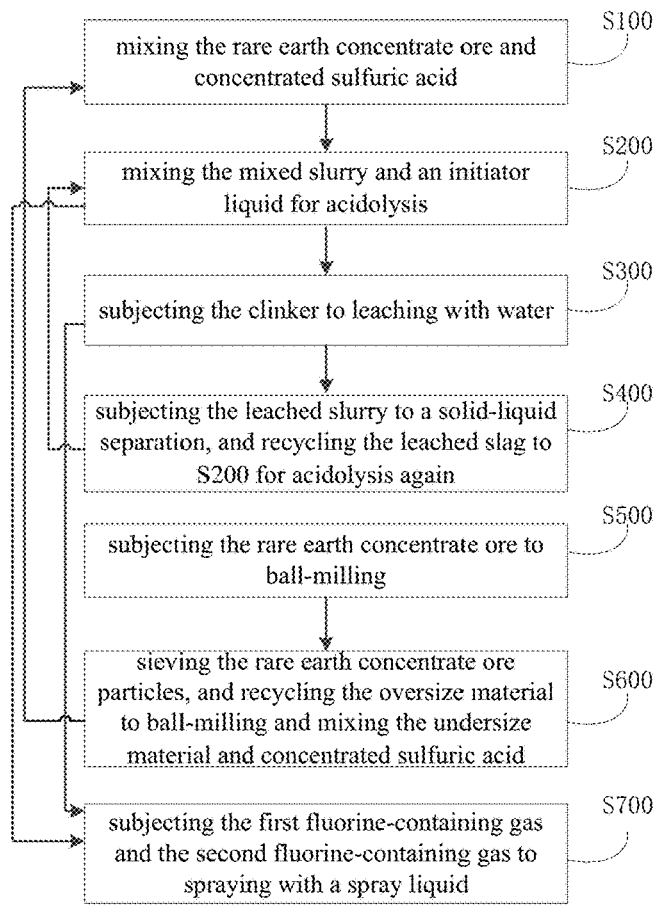
FIG. 3 is a flow chart showing a method for processing a rare earth concentrate ore according to still another embodiment of the present disclosure.

In an embodiment of the present disclosure, as shown in FIG. 3, the method and the system as described above further include a following step.

In S700, the first fluorine-containing gas and the second fluorine-containing gas are subjected to spraying with a spray liquid.

In this step, the first fluorine-containing gas and the second fluorine-containing gas are subjected to spraying with the spray liquid, thereby obtaining a fluorine-containing slurry. On this basis, the fluorine-containing gas can be recycled to avoid the pollution of exhaust gas to the environment. It is found that both the mixing device and the acidolysis device have a temperature control device, and thus impurities in the first fluorine-containing gas and the second fluorine-containing gas are significantly reduced, and dust contents of the first fluorine-containing gas and the second fluorine-containing gas are small. Therefore, the spray liquid may be sprayed to the fluorine-containing gas directly and there is no need to provide a dust removing device before the spray treatment. The fluorine-containing gas and the dust therein may be dissolved in the spray liquid. After a filtering process, the filtrated slag may be returned to the acidolysis device, and the filtrate may be used to prepare fluorides. It is beneficial to realize recovery and utilization of fluorine-containing gas and avoid the pollution of the exhaust gas to the environment.

In an embodiment of the present disclosure, specific type of the spray liquid is not particularly limited, and may be selected by those skilled in the art according to actual needs. In a specific embodiment of the present disclosure, the spray liquid is at least one selected from water and an alkaline liquid. Specifically, the alkaline liquid may be ammonium hydroxide. Therefore, it is advantageous to realize the recovery and utilization of the fluorine-containing gas and to avoid the pollution of the exhaust gas to the environment.

Figure 4:
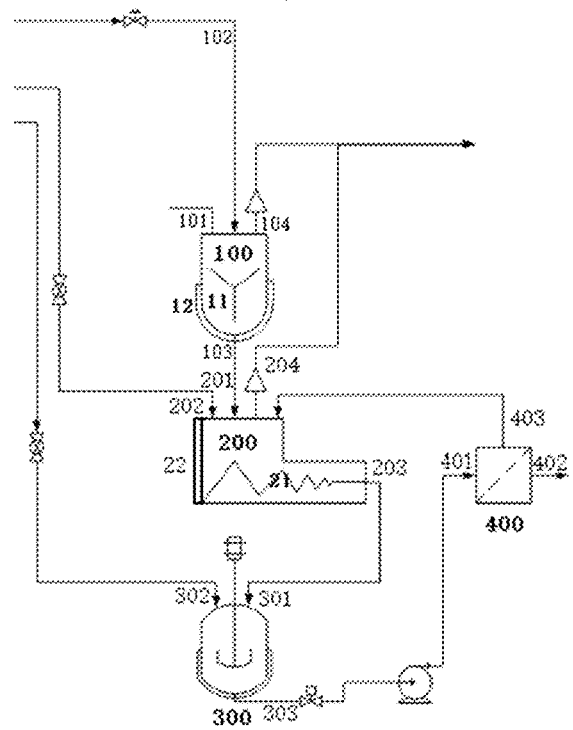
FIG. 4 is a schematic diagram illustrating a system for processing a rare earth concentrate ore according to an embodiment of the present disclosure.

In another aspect, the present disclosure provides in embodiments a system for processing a rare earth concentrate ore, which is able to perform the method for processing the rare earth concentrate ore as described above. In an embodiment of the present disclosure, as shown in FIG. 4, the system includes a mixing device 100, an acidolysis device 200, a leaching device 300, and a solid-liquid separator 400.

In an embodiment of the present disclosure, the mixing device 100 has a rare earth concentrate ore inlet 101, a concentrated sulfuric acid inlet 102, a mixed slurry outlet 103 and a first fluorine-containing gas outlet 104. Moreover, an agitator 11 is arranged in the mixing device and a water-cooled jacket 12 is disposed on an outer wall of the mixing device. The mixing device 100 is suitable to mix the rare earth concentrate ore and the concentrated sulfuric acid to obtain the mixed slurry and the first fluorine-containing gas. Specifically, the rare earth concentrate ore and the concentrated sulfuric acid are mixed in the mixing device. During mixing with the acid, a small amount of gas containing $CO_2$, HF and $SiF_4$ is generated. $CO_2$ and HF are from the reactions between carbonates in the rare earth concentrate ore and the concentrated sulfuric acid. Moreover, some solid dust is accompanied in the first fluorine-containing gas. Specifically, the rare earth concentrate ore having a suitable particle diameter is added to the mixing device through a quantitative feeder and mixed with the metered concentrated sulfuric acid in a certain ratio. After stirring for a certain period, the mixed slurry is formed, during which circulating water is used for cooling, so as to control the temperature inside the mixing device within a suitable range. It is found that, by arranging the agitator in the mixing device, the rare earth concentrate ore and the concentrated sulfuric acid can be mixed rapidly and forcibly, such that the rare earth concentrates are sufficiently infiltrated by the concentrated sulfuric acid, thus preventing agglomeration from occurring in the subsequent acidolysis process and providing favorable conditions for mass transfer of the acidolysis process. Moreover, the water-cooled jacket is disposed on the mixing device to cool the mixing device with the circulating water, such that the temperature inside the mixing device is kept in a constant range. It should be noted that the above rare earth concentrate ore may be the bastnaesite ore (the fluorocarbon cerium rare earth ore) or Baotou mixed ore (bastnaesite and monazite). The concentrated sulfuric acid as described above can be pumped into the mixing device in a metered amount. The agitator in the mixing device is not particularly limited, and may be selected by those skilled in the art according to actual needs. For example, the agitator may be a double-layer stirring propeller, that is, an upper layer of propeller and a lower layer of propeller are arranged on a stirring shaft, which may be used for strongly mixing the rare earth concentrate ore with the concentrated sulfuric acid.

In an embodiment of the present disclosure, in the mixing device 100, the rare earth concentrate ore inlet 101, the concentrated sulfuric acid inlet 102 and the first fluorine-containing gas outlet 104 are independently located above the agitator 11, and the mixed slurry outlet 103 is located below the agitator 11. Therefore, it is beneficial to flow motion of the reaction between the rare earth concentrate ore and the concentrated sulfuric acid, and the efficiency of the whole process is improved.

In another embodiment of the present disclosure, the particle diameter of the rare earth concentrate ore is not particularly limited, and may be selected by those skilled in the art according to actual needs. In a specific embodiment of the present disclosure, the rare earth concentrate ore may have a particle diameter ranging from 80 to 320 meshes. It is found that if the particle diameter of the rare earth concentrate ore is too large, it is not conducive to the reaction between the rare earth concentrate ore and the concentrated sulfuric acid. While a small particle diameter can increase the contact area between the rare earth concentrate ore and the concentrated sulfuric acid, but if the particle diameter is too small, the reaction will be too intense, making it impossible to be controlled, thereby consuming excessive energy for milling and reducing the decomposition rate of rare earth concentrate ore as well. Therefore, the particle diameter of the rare earth concentrate ore according to the embodiment of the present disclosure can significantly increase the decomposition rate of the rare earth concentrate ore and save energy at the same time.

In still another embodiment of the present disclosure, a mass ratio of the rare earth concentrate ore to the concentrated sulfuric acid is not particularly limited, and may be selected by those skilled in the art according to actual needs. In a specific embodiment of the present disclosure, the mass ratio of the rare earth concentrate ore to the concentrated sulfuric acid is in a range of 1:(1.2 to 1.5). It is found that if the mass ratio of the rare earth concentrate ore to the concentrated sulfuric acid is too large, the reaction between the rare earth concentrate ore and the concentrated sulfuric acid is insufficient, resulting in low decomposition rate of the rare earth concentrate ore and difficulty in separating thorium from the rare earth concentrate ore, in this case thorium is enriched in the leached slag to form a radioactive slag. If the mass ratio of the rare earth concentrate ore to the concentrated sulphuric acid is too small, the concentrated sulfuric acid is excessively consumed, the mixing time is prolonged, and the residual acid in the subsequent processes is high. Therefore, the mass ratio of the rare earth concentrate ore and the concentrated sulfuric acid provided by the present disclosure can further increase the decomposition rate of the rare earth concentrate ore, and at the same time increase a mixing rate and save energy.

In a further embodiment of the present disclosure, mixing conditions are not particularly limited, and may be selected by those skilled in the art according to actual needs. In a specific embodiment of the present disclosure, the mixing is performed at a temperature of not higher than 30° C. for a time period in a range of 5 to 15 minutes. It is found that if the mixing temperature is too high, the rare earth concentrate ore will be reacted with the concentrated sulfuric acid locally in advance, resulting in a poor mixing effect. If the mixing time period is too short to reach the condition that the rare earth concentrate ore is in full contact with the concentrated sulfuric acid, mass transfer will be negatively affected. Therefore, if the mixing temperature is too high and the mixing time is too long or too short, the decomposition rate of the oxides of the rare earth elements is decreased.

In a further embodiment of the present disclosure, a mass concentration of the concentrated sulfuric acid is not particularly limited, and may be selected by those skilled in the art according to actual needs. In a specific embodiment of the present disclosure, the concentrated sulfuric acid has a mass concentration of not less than 93 wt %. It is found that the mass concentration of the concentrated sulfuric acid can significantly improve the efficiency of infiltrating the rare earth concentrate ore, and at the same time improve the quality of the mixed slurry, thus increasing the decomposition rate of the oxides of the rare earth elements.

In an embodiment of the present disclosure, the acidolysis device 200 has a mixed slurry inlet 201, an initiator liquid inlet 202, a clinker outlet 203 and a second fluorine-containing gas outlet 204. The mixed slurry inlet 201 is connected to the mixed slurry outlet 103. A stirring propeller 21 is arranged in the acidolysis device 200, and a heating device 22 is disposed on an outer wall of the acidolysis device. The acidolysis device 200 is suitable to mix the mixed slurry and the initiator liquid for acidolysis, so as to obtain the clinker and the second fluorine-containing gas. Specifically, the mixed slurry is added to the acidolysis device through the mixed slurry outlet of the mixing device, and a valve of the initiator liquid inlet is opened at the same time. The concentrated sulfuric acid in the mixed slurry is diluted to release heat, and a temperature inside the acidolysis device is adjusted by an auxiliary heating device, so as to perform the acidolysis reaction completely in the acidolysis device to form the bulk clinker. It is found that two processes of aging and calcining can be realized in the acidolysis device at the same time, thus significantly shortening the time period of the acidolysis reaction of the rare earth concentrate ore. Moreover, in the acidolysis process, viscosity of the internal materials changes greatly, that is, the internal materials are changed gradually from a fluid state to a semi-dry state, and finally become dry, thereby obtaining the clinker. The acidolysis device can effectively cope with the changes in the characteristics of the above materials. Further, the stirring propeller is arranged in the acidolysis device to accelerate the progress of the acidolysis reaction, and the heating device is disposed on an outer wall of the acidolysis device to provide a suitable temperature for the acidolysis reaction. Since the temperature of the entire acidolysis process is kept low, sulfur-containing gas is prevented from being generated due to the decomposition of the concentrated sulfuric acid, and thus it is possible to recycle the second fluorine-containing gas. At the same time, thorium is prevented from being in the slag which may cause the radioactive pollution and the waste of thorium. It should be noted that the acidolysis device as described above is not particularly limited, and may be selected by those skilled in the art according to actual needs, for example, it may be a horizontal reactor. The stirring propeller may be a spiral biaxial propeller with two stirring paddles having different rotation rates, and one paddle is arranged on one of two shafts which are arranged in parallel. The heating device may have a heating manner of electric heating or steam heating.

In an embodiment of the present disclosure, in the acidolysis device 200, the mixed slurry inlet 201 and the second fluorine-containing gas outlet 204 are independently located at an upper portion of the acidolysis device 200, and the clinker outlet 203 is located at a lower portion of the acidolysis device 200. Therefore, it is beneficial to flow motion of the acidolysis reaction in the acidolysis device, and the efficiency of the whole process is improved.

In another embodiment of the present disclosure, acidolysis conditions are not particularly limited, and may be selected by those skilled in the art according to actual needs. In a specific embodiment of the present disclosure, the acidolysis is performed at a temperature ranging from 150 to 300° C. for a time period in a range of 1 to 4 hours. It is found that if the acidolysis temperature is too high, the concentrated sulfuric acid will be decomposed to generate sulfur-containing gas, and at the same time, it may be difficult to leach thorium from the clinker into the solution, and thorium may remain in the leached slag to form the radioactive solid waste. If the acidolysis temperature is too low or the acidolysis time period is too short, the decomposition rate of the oxides of the rare earth elements is low. If the acidolysis time period is too long, the decomposition rate of the rare earth concentrate ore is not further increased after it reaches a certain degree, but the energy consumption is increased and a time period of the whole process is prolonged. Therefore, the temperature and time period of the acidolysis provided by the present disclosure can significantly increase the decomposition rate of the rare earth concentrate ore, increase the leaching rate of the thorium and save energy at the same time.

In still another embodiment of the present disclosure, the type of the initiator liquid is not particularly limited, and may be selected by those skilled in the art according to actual needs. In a specific embodiment of the present disclosure, the initiator liquid is at least one selected from waste acid and industrial water from a subsequent process. It is found that a certain temperature should be reached to perform the acidolysis reaction. The initiator liquid is used for diluting the concentrated sulfuric acid to release heat to increase the temperature of the mixed slurry and activate the acidolysis reaction, such that the dilution heat can be utilized to reduce supply of an external heat source.

In the process, the rare earth concentrate ore and the concentrated sulfuric acid are mixed and heated to a certain temperature, components REO, $ThO_2$ and the like contained in the concentrate ore are reacted with sulfuric acid to form soluble sulfates. $CaF_2$, $Fe_2O_3$ and the like are also reacted to different degrees into sulfates. Rare earth sulfates, thorium sulfate, iron sulfate or the like can be dissolved in an aqueous solution. Fluorine exists in a form of HF or $SiF_4$ in calcined exhaust gas and can be reacted with ammonia in the presence of vapour to form solid ammonium bifluoride ($NH_4HF_2$), which is sold as a product. During such a process (at 150 to 300° C.), sulfuric acid does not decompose and only a small amount of sulfuric acid is evaporated. There are only HF, $SiF_4$ and a small amount of sulfuric acid mist in flue gas, thus improving conditions for recycling fluorine as a by-product from the flue gas.

(1) main reactions of the acidolysis of bastnaesite concentrate ore are as follows.

$$2REFCO_3 + 3H_2SO_4 = RE_2(SO_4)_3 + 2HF\uparrow + 2CO_2\uparrow + 2H_2O$$

$$ThO_2 + 2H_2SO_4 = Th(SO_4)_2 + 2H_2O$$

(2) monazite is decomposed as follows.

$$2REPO_4 + 3H_2SO_4 = RE_2(SO_4)_3 + 2H_3PO_4$$

$$Th_3(PO_4)_4 + 6H_2SO_4 = 3Th(SO_4)_2 + H_3PO_4$$

Side reactions are as follows.

$$CaF_2 + H_2SO_4 = CaSO_4 + 2HF\uparrow$$

$$Fe_2O_3 + 3H_2SO_4 = Fe_2(SO_4)_3 + 3H_2O$$

$$SiO_2 + 4HF = SiF_4\uparrow + 2H_2O$$

In an embodiment of the present disclosure, the leaching device 300 has a clinker inlet 301, a water inlet 302, and a leached slurry outlet 303. The clinker inlet 301 is connected to the clinker outlet 203. The leaching device 300 is suitable to mix the clinker with water for leaching, so as to obtain the leached slurry. Specifically, the bulk clinker in the acidolysis device is sent, through the clinker outlet, to the leaching device via a quantitative screw conveyor, and then a certain proportion of water is added to perform the leaching. After a period of time, the leached slurry is formed. It is found that after thorium is converted into thorium acid slat in the acidolysis process, the thorium acid slat is leached into the leached slurry. On this basis, thorium can be recycled to avoid the radioactive hazard to the environment.

In an embodiment of the present disclosure, leaching conditions are not particularly limited, and may be selected by those skilled in the art according to actual needs. In a specific embodiment of the present disclosure, a leaching temperature is an environment temperature and a time period of leaching is in a range of 0.5 to 1 h. It is found that the leaching temperature is the environment temperature, and sulfates in the clinker can be dissolved in water without heating, thus avoiding an external heat source. At the same time, an appropriate leaching period can ensure complete dissolution of the sulfates.

In another embodiment of the present disclosure, a mass ratio of water to the clinker is not particularly limited, and may be selected by those skilled in the art according to actual needs. In a specific embodiment of the present disclosure, the mass ratio of water to the clinker is in a range of (8 to 12):1. It is found that if the mass ratio of water to clinker is too small, sulfates may be supersaturated and thus crystallized, and the mass ratio of water to clinker should not be too large, otherwise, a material flow amount of the system may be too large, resulting in difficulties in processing subsequent waste liquid.

In an embodiment of the present disclosure, the solid-liquid separator 400 has a leached slurry inlet 401, a filtrate outlet 402 and a leached slag outlet 403. The leached slurry inlet 401 is connected to the leached slurry outlet 303, and the leached slag outlet 403 is connected to the acidolysis device 200. The solid-liquid separator 400 is suitable to perform the solid-liquid separation to the leached slurry, so as to obtain the filtrate and the leached slag, and to recycle the leached slag to the acidolysis device for acidolysis. Specifically, the leached slurry obtained from the leaching device is transferred to the solid-liquid separator by a pump for solid-liquid separation, thereby obtaining the filtrate and the leached slag. The leached slag is quantitatively returned to the acidolysis device in batches, and the filtrate is transferred to a next extraction process. Therefore, the decomposition rate of the oxides of the rare earth elements can be remarkably improved, and the thorium recovery rate can be improved at the same time.

With the system for processing the rare earth concentrate ore according to embodiments of the present disclosure, by arranging the agitator in the mixing device, the rare earth concentrate ore and the concentrated sulfuric acid can be mixed rapidly and forcibly, such that the rare earth concentrates are sufficiently infiltrated by the concentrated sulfuric acid, thus preventing agglomeration from occurring in the subsequent acidolysis process and providing favorable conditions for mass transfer of the acidolysis process. Moreover, the water-cooled jacket is disposed on an outer wall of the mixing device to cool the mixing device with circulating water, such that the temperature inside the mixing device is kept in a constant range, in this case, it is possible to avoid the decomposition of rare earth ore at high temperatures, thereby realizing the recovery of thorium. In the present disclosure, two processes of aging and calcining can be realized in an acidolysis device at the same time, thus significantly shortening the time period of acidolysis reaction of the rare earth concentrate ore. Further, in the acidolysis process, viscosity of the internal materials changes greatly, that is, the internal materials are changed gradually from a fluid state to a semi-dry state, and finally become dry, thereby obtaining the clinker. The acidolysis device can effectively cope with the changes in the characteristics of the above materials. Further, the stirring propeller is arranged in the acidolysis device to accelerate the progress of the acidolysis reaction, and the heating device is disposed on an outer wall of the acidolysis device to provide a suitable temperature for the acidolysis reaction. Since the temperature of the entire acidolysis process is kept low, thorium is prevented from being in the slag which may cause the radioactive pollution and the waste of thorium, moreover, sulfur-containing gas is prevented from being generated in the decomposition of concentrated sulfuric acid, and thus it is possible to recycle the second fluorine-containing gas. In the acidolysis process, the thorium in the rare earth concentrate becomes thorium acid salt which enters into the leached slurry during leaching. Therefore, thorium can be recycled to avoid the radioactive hazard to the environment. The solid-liquid separation is further performed on the leached slurry, and the obtained leached slag can be recycled to the acidolysis process again, thus further improving a thorium recovery rate and the REO decomposition rate. Therefore, the present system has advantages of wide adaptability of raw materials, low energy consumption and continuous production. At the same time, thorium can be effectively recovered, and the decomposition rate of the rare earth concentrate ore can be significantly improved, for example, the REO decomposition rate can reach 96%.

Figure 5:
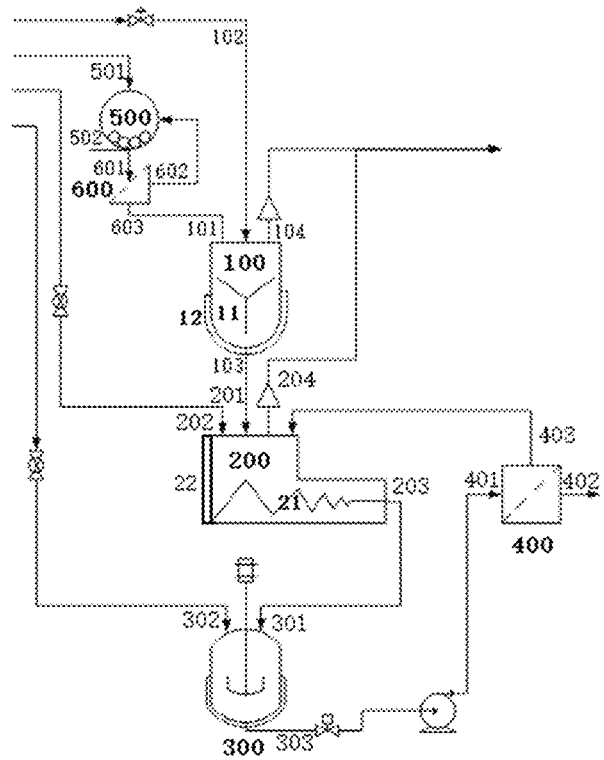
FIG. 5 is a schematic diagram illustrating a system for processing a rare earth concentrate ore according to another embodiment of the present disclosure.

In addition, in an embodiment of the present disclosure, as shown in FIG. 5, the system for processing the rare earth concentrate ore further includes a ball-milling device 500 and a sieving device 600.

In an embodiment of the present disclosure, the ball-milling device 500 has a rare earth concentrate ore inlet 501 and a rare earth concentrate ore particle outlet 502, and is suitable to ball-mill the rare earth concentrate ore before the rare earth concentrate ore and the concentrated sulfuric acid are mixed, so as to obtain the rare earth concentrate ore particles, thus increasing the decomposition rate of the oxides of the rare earth elements.

In an embodiment of the present disclosure, the sieving device 600 has a rare earth concentrate ore particle inlet 601, an oversize material outlet 602 and an undersize material outlet 603. The rare earth concentrate ore particle inlet 601 is connected to the rare earth concentrate ore particle outlet 502, the oversize material outlet 602 is connected to the ball-milling device 500, and the undersize material outlet 603 is connected to the rare earth concentrate ore inlet 101. The sieving device 600 is suitable to sieve the rare earth concentrate ore particles obtained as described above, so as to obtain the oversize material and the undersize material. The oversize material is recycled to ball-milling and the undersize material is mixed with the concentrated sulfuric acid. It is found that sieved oversize material having an unqualified particle size is returned to the ball-milling device for ball-milling, raw material cost and time cost of this process can be significantly reduced, and sieved undersize material is transferred into the mixing device and mixed with the concentrated sulfuric acid, so as to further increase the decomposition rate of the oxides of the rare earth elements. It should be understood that the undersize material outlet of the sieving device may be connected to the rare earth concentrate ore inlet of the mixing device by a metering device. Specifically, the undersize material has a particle diameter ranging from 80 to 320 meshes.

Figure 6:
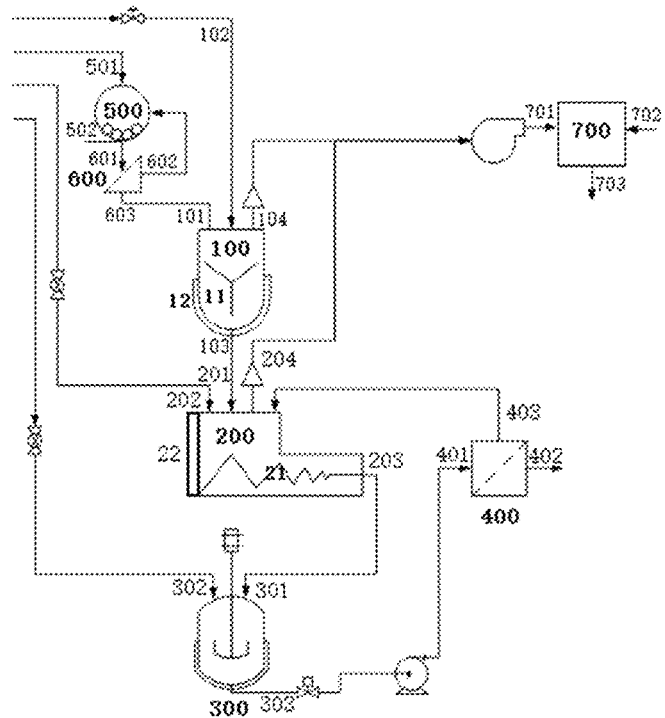
FIG. 6 is a schematic diagram illustrating a system for processing a rare earth concentrate ore according to still another embodiment of the present disclosure.

In an embodiment of the present disclosure, as shown in FIG. 6, the system for processing the rare earth concentrate ore further includes a gas processing device 700.

In an embodiment of the present disclosure, the gas processing device 700 has a fluorine-containing gas inlet 701, a spray liquid inlet 702 and a fluorine-containing slurry outlet 703. The fluorine-containing gas inlet 701 is connected to both the first fluorine-containing gas outlet 104 and the second fluorine-containing gas outlet 204. The gas processing device 700 is suitable to spray the spray liquid to the first fluorine-containing gas and the second fluorine-containing gas, so as to obtain a fluorine-containing slurry. It is found that both the mixing device and the acidolysis device have a temperature control device, and thus impurities in the first fluorine-containing gas and the second fluorine-containing gas are significantly reduced, and dust contents of the first fluorine-containing gas and the second fluorine-containing gas are small. Therefore, the spray liquid may be sprayed to the fluorine-containing gas directly and there is no need to provide a dust removing device before the spray treatment. The fluorine-containing gas and the dust therein may be dissolved in the spray liquid. After a filtering process, the filtrated slag may be returned to the acidolysis device, and the filtrate may be used to prepare fluorides. It is beneficial to realize recovery and utilization of fluorine-containing gas and avoid the pollution of the exhaust gas to the environment.

In an embodiment of the present disclosure, specific type of the spray liquid is not particularly limited, and may be selected by those skilled in the art according to actual needs. In a specific embodiment of the present disclosure, the spray liquid is at least one selected from water and an alkaline liquid. Specifically, the alkaline liquid may be ammonium hydroxide. Therefore, it is advantageous to realize the recovery and utilization of the fluorine-containing gas and to avoid the pollution of the exhaust gas to the environment.

The present disclosure is described with reference to the specific examples, which are only illustrative and are not intended to limit the present disclosure.

EXAMPLE 1

Bastnaesite ore was ball-milled by a ball-milling device and sieved by a sieving device to obtain bastnaesite particles having a particle diameter of 80 to 320 meshes. The bastnaesite particles were metered and added in a mixing device containing pre-metered 98 wt % concentrated sulfuric acid. A mass ratio of the concentrated sulfuric acid to the bastnaesite particles was 1.4:1. Water was circulated for cooling the mixing device to keep the temperature in the mixing device less than 30° C. After fully stirring for 10 minutes, a mixed slurry was formed and the acid was uniform, at the same time a first fluorine-containing gas was generated. Then, the mixed slurry was discharged through a mixed slurry outlet of the mixing device, and added into an acidolysis device. A valve of an initiator liquid (industrial water) inlet was opened, and the concentrated sulfuric acid in the mixed slurry was diluted to release heat. A temperature inside the acidolysis device was adjusted by an auxiliary heating device. After stirring at 120° C. for 30 minutes, the mixed slurry was immediately subjected to the acidolysis reaction at 250° C. for 1 h, thereby obtaining a bulk clinker and generating a second fluorine-containing gas at the same time. The bulk clinker was quantitatively fed to a leaching device from a clinker outlet of the acidolysis device. In the leaching device, water was metered in a mass ratio of water to the clinker of 8:1, and added in a leaching tank with mechanically stirring for 1 hour to form a leached slurry. The leached slurry was pumped to a plate and frame filter press for pressing and filtering, thereby obtaining a filtrate and a leached slag having a slag rate of 8 wt %. Chemical composition of the leached slag was analyzed, and the leaching slag was quantitatively returned to the acidolysis device in batches, and the leached liquid was fed to a subsequent extraction process.

In this example, a decomposition rate of REO (oxides of the rare earth elements) is 95.18%, and the first fluorine-containing gas and the second fluorine-containing gas are recovered by a tail gas absorption tower, and thus fluorine is recycled and utilized.

EXAMPLE 2

Bastnaesite ore was ball-milled by a ball-milling device and sieved by a sieving device to obtain bastnaesite particles having a particle diameter of 80 to 320 meshes. The bastnaesite particles were metered and added in a mixing device containing pre-metered 98 wt % concentrated sulfuric acid. A mass ratio of the concentrated sulfuric acid to the bastnaesite particles was 1.5:1. Water was circulated for cooling the mixing device to keep the temperature in the mixing device less than 30° C. After fully stirring for 8 minutes, a mixed slurry was formed and the acid was uniform, at the same time a first fluorine-containing gas was generated. Then, the mixed slurry was discharged through a mixed slurry outlet of the mixing device, and added into an acidolysis device. A valve of an initiator liquid (waste acid) inlet was opened, and the concentrated sulfuric acid in the mixed slurry was diluted to release heat. A temperature inside the acidolysis device was adjusted by an auxiliary heating device. After stirring at 130° C. for 30 minutes, the mixed slurry was immediately subjected to the acidolysis reaction at 280° C. for 1 h, thereby obtaining a bulk clinker and generating a second fluorine-containing gas at the same time. The bulk clinker was quantitatively fed to a leaching device from a clinker outlet of the acidolysis device. In the leaching device, water was metered in a mass ratio of water to the clinker of 10:1, and added in a leaching tank with mechanically stirring for 0.5 hour to form a leached slurry. The leached slurry was pumped to a plate and frame filter press for pressing and filtering, thereby obtaining a filtrate and a leached slag having a slag rate of 6.3 wt %. Chemical composition of the leached slag was analyzed, and the leaching slag was quantitatively returned to the acidolysis device in batches, and the leached liquid was fed to a subsequent extraction process.

In this example, a decomposition rate of REO (oxides of the rare earth elements) is 96%, and the first fluorine-containing gas and the second fluorine-containing gas are recovered by a tail gas absorption tower, and thus fluorine is recycled and utilized.

EXAMPLE 3

A mixed ore including bastnaesite and monazite and having a particle diameter of 80 to 320 meshes was metered and added in a mixing device containing pre-metered 98 wt % concentrated sulfuric acid. A mass ratio of the concentrated sulfuric acid to the mixed ore was 1.5:1. Water was circulated for cooling the mixing device to keep the temperature in the mixing device less than 30° C. After fully stirring for 10 minutes, a mixed slurry was formed and the acid was uniform, at the same time a first fluorine-containing gas was generated. Then, the mixed slurry was discharged through a mixed slurry outlet of the mixing device, and added into an acidolysis device. A valve of an initiator liquid (a mixed liquid including industrial water and waste acid) inlet was opened, and the concentrated sulfuric acid in the mixed slurry was diluted to release heat. A temperature inside the acidolysis device was adjusted by an auxiliary heating device. After stirring at 85° C. for 30 minutes, the mixed slurry was immediately subjected to the acidolysis reaction at 280° C. for 2 h, thereby obtaining a bulk clinker and generating a second fluorine-containing gas at the same time. The bulk clinker was quantitatively fed to a leaching device from a clinker outlet of the acidolysis device. In the leaching device, water was metered in a mass ratio of water to the clinker of 12:1, and added in a leaching tank with mechanically stirring for 1 hour to form a leached slurry. The leached slurry was pumped to a plate and frame filter press for pressing and filtering, thereby obtaining a filtrate and a leached slag having a slag rate of 6.8 wt %. Chemical composition of the leached slag was analyzed, and the leaching slag was quantitatively returned to the acidolysis device in batches, and the leached liquid was fed to a subsequent extraction process.

In this example, a decomposition rate of REO (oxides of the rare earth elements) is 96%, and the first fluorine-containing gas and the second fluorine-containing gas are recovered by a tail gas absorption tower, and thus fluorine is recycled and utilized.

EXAMPLE 4

A mixed ore including bastnaesite and monazite and having a particle diameter of 80 to 320 meshes was metered and added in a mixing device containing pre-metered 98 wt % concentrated sulfuric acid. A mass ratio of the concentrated sulfuric acid to the mixed ore was 1.4:1. Water was circulated for cooling the mixing device to keep the temperature in the mixing device less than 30° C. After fully stirring for 15 minutes, a mixed slurry was formed and the acid was uniform, at the same time a first fluorine-containing gas was generated. Then, the mixed slurry was discharged through a mixed slurry outlet of the mixing device, and added into an acidolysis device. A valve of an initiator liquid (industrial water) inlet was opened, and the concentrated sulfuric acid in the mixed slurry was diluted to release heat. A temperature inside the acidolysis device was adjusted by an auxiliary heating device. After stirring at 100° C. for 30 minutes, the mixed slurry was immediately subjected to the acidolysis reaction at 280° C. for 2 h, thereby obtaining a bulk clinker and generating a second fluorine-containing gas at the same time. The bulk clinker was quantitatively fed to a leaching device from a clinker outlet of the acidolysis device. In the leaching device, water was metered in a mass ratio of water to the clinker of 10:1, and added in a leaching tank with mechanically stirring for 1 hour to form a leached slurry. The leached slurry was pumped to a plate and frame filter press for pressing and filtering, thereby obtaining a filtrate and a leached slag having a slag rate of 7.2 wt %. Chemical composition of the leached slag was analyzed, and the leaching slag was quantitatively returned to the acidolysis device in batches, and the leached liquid was fed to a subsequent extraction process.

In this example, a decomposition rate of REO (oxides of the rare earth elements) is 96%, and the first fluorine-containing gas and the second fluorine-containing gas are recovered by a tail gas absorption tower, and thus fluorine is recycled and utilized.

Specific embodiments of the present disclosure have been described in detail above, however, the present disclosure is not limited to the specific details in the above-described embodiments. Various simple modifications can be made to the technical solutions of the present disclosure within the scope of the technical concept of the present disclosure, and thus all the various modifications shall fall within the claimed scope of the present disclosure.

It should be further noted that the specific technical features described in the above specific embodiments may be combined in any suitable manner as long as they are not in contradiction with each other. In order to avoid unnecessary repetition, possible combinations are not described herein in details.

In addition, different embodiments of the present disclosure may also be combined as long as they do not deviate from the concept of the present disclosure, and should also be regarded as the disclosure of the present disclosure. Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for processing a rare earth concentrate ore, comprising:
   (1) mixing the rare earth concentrate ore and concentrated sulfuric acid, thereby obtaining a mixed slurry and a first fluorine-containing gas, wherein the mixing is performed at a temperature of not higher than 30° C. for a time period in a range of 5 to 15 minutes;
   (2) mixing the mixed slurry and an initiator liquid for acidolysis, thereby obtaining a clinker and a second fluorine-containing gas, wherein the initiator liquid is added to dilute the concentrated sulfuric acid to make the acidolysis happen;
   (3) subjecting the clinker to leaching with water, thereby obtaining a leached slurry; and
   (4) subjecting the leached slurry to a solid-liquid separation, thereby obtaining a filtrate and a leached slag, and recycling the leached slag to step (2) for acidolysis again.

2. The method according to claim 1, wherein before mixing the rare earth concentrate ore and concentrated sulfuric acid, the method further comprises:
   (5) subjecting the rare earth concentrate ore to ball-milling, thereby obtaining rare earth concentrate ore particles; and
   (6) sieving the rare earth concentrate ore particles, thereby obtaining an oversize material and an undersize material, and recycling the oversize material to ball-milling and mixing the undersize material and concentrated sulfuric acid.

3. The method according to claim 1, further comprising:
   (7) subjecting the first fluorine-containing gas and the second fluorine-containing gas to spraying with a spray liquid, thereby obtaining a fluorine-containing slurry.

4. The method according to claim 3, wherein in step (7), the spray liquid is at least one selected from water and an alkaline liquid.

5. The method according to claim 1, wherein in step (1), the rare earth concentrate ore has a particle diameter ranging from 80 to 320 meshes.

6. The method according to claim 1, wherein in step (1), a mass ratio of the rare earth concentrate ore to the concentrated sulfuric acid is in a range of 1: (1.2 to 1.5).

7. The method according to claim 1, wherein in step (1), the concentrated sulfuric acid has a mass concentration of not less than 93 wt %.

8. The method according to claim 1, wherein in step (2), the acidolysis is performed at a temperature ranging from 150 to 300° C. for a time period in a range of 1 to 4 hours.

9. The method according to claim 1, wherein in step (2), the initiator liquid is at least one selected from industrial water and a filtrate from a subsequent process.

10. The method according to claim 1, wherein in step (3), a time period of leaching is in a range of 0.5 to 1 h.

11. The method according to claim 1, wherein in step (3), a mass ratio of water to the clinker is in a range of (8 to 12): 1.

* * * * *